United States Patent [19]

Sachetti

[11] Patent Number: 5,018,232
[45] Date of Patent: May 28, 1991

[54] COVER

[76] Inventor: Terrance W. Sachetti, 5930 W. Broadway #9, Crystal, Minn. 55428

[21] Appl. No.: 437,625

[22] Filed: Nov. 17, 1989

Related U.S. Application Data

[60] Continuation-in-part of Ser. No. 223,424, Jul. 25, 1988, Pat. No. 4,894,101, which is a division of Ser. No. 934,462, Nov. 24, 1986, Pat. No. 4,759,090.

[51] Int. Cl.$^5$ ............................................. A47G 9/02
[52] U.S. Cl. ....................................... 5/482; 428/196
[58] Field of Search .................... 5/413, 482, 502; 40/541-543, 570; 283/85, 92, 93; 428/196; D5/47, 58; D6/595, 596, 602, 603, 622; 235/491

[56] References Cited

U.S. PATENT DOCUMENTS

| D. 113,068 | 1/1939 | Lawson | D6/603 |
|---|---|---|---|
| D. 113,075 | 1/1939 | Lawson | D6/603 |
| D. 113,426 | 2/1939 | Lawson | D6/603 |
| D. 113,598 | 2/1939 | Lawson | D6/603 |
| D. 114,274 | 4/1939 | Steinwig | D6/603 |
| D. 115,278 | 6/1939 | Steinwig | D6/603 |
| D. 115,706 | 7/1939 | Fassler | D6/603 |
| D. 116,168 | 8/1939 | Lawson | D6/603 |
| D. 116,195 | 8/1939 | Steinwig | D6/603 |
| 2,382,806 | 8/1945 | Motson | 40/542 X |
| 3,613,133 | 10/1971 | Isola et al. | 5/482 X |
| 3,873,390 | 3/1975 | Cornell et al. | 156/230 X |
| 4,122,237 | 10/1978 | Kaiserman | 40/542 X |
| 4,759,090 | 7/1988 | Sachetti | 5/482 |

FOREIGN PATENT DOCUMENTS

| 3522667 | 1/1983 | Fed. Rep. of Germany | 5/482 |
|---|---|---|---|
| 3710123 | 9/1988 | Fed. Rep. of Germany | 5/482 |
| 0239239 | 11/1985 | Japan | 5/482 |

Primary Examiner—Michael F. Trettel
Attorney, Agent, or Firm—Burd, Bartz & Gutenkauf

[57] ABSTRACT

A cover in the form of a blanket has a protective grid of phosphorescent material that when exposed to light and placed in a dark environment emits light for a period of time. The protective grid is a pattern of intersecting ribbons of photophorescent material anchored to and covering substantially one surface of a fabric. The protective grid provides a visual light shield that creates an image of protection and is useable for amusement and entertainment.

59 Claims, 5 Drawing Sheets

COVER

CROSS REFERENCE TO RELATED APPLICATIONS

This application is a continuation-in-part of U.S. application Ser. No. 223,424 filed July 25, 1988, now U.S. Pat. No. 4,894,101. Application Ser. No. 223,424 is a division of U.S. application Ser. No. 934,462 filed Nov. 24, 1986, now U.S. Pat. No. 4,759,090.

FIELD OF INVENTION

The invention is in the general field of covers for objects and surfaces that provide a sense of security, comfort, and amusement. More particularly, the cover is a fabric having a protective pattern of phosphorescent and fluorescence materials that establishes in darkness and black light a perceived energized light shield that mitigates human fears, such as nyctophobia, myxophobia, phasmophobia, teratophobia, and blennophobia.

BACKGROUND OF INVENTION

Various types of bedding have been used to provide entertainment and personal comfort for persons. Examples of bedding products are disclosed by Shapiro in U.S. Pat. No. 3,266,063 and Isola et al in U.S. Pat. No. 3,613,133. Shapiro shows a bedspread which causes a bed to resemble a three dimensional object such as an automobile or a treasure chest. Isola et al relates to the illustration of characters on sheets, pillow cases or blankets with each layer depicting the characters in different stages of attire. Phosphorescent materials are used to enhance characters, such as a cartoon mouse, cat, dog, bear or horse on clothing and sheet member. These bed clothes make going to bed a desired activity for young persons. Conventional bed products loses its visual characteristics in a darkened room. These bedding products do not soothe the nyctophobic person. The person does not have a sense of security from the threat of imaginary monsters and evil spirits resulting in loss of sleep. Some persons have fears or phobias concerning darkness, slime, ghosts and monsters. These fears are rooted in a perception of force, power or a person or thing that is believed as threatening. Phobia clinics are available for diagnostic, testing, and treatment. One object of the cover of the invention is to provide a structure that is useful to comfort, amuse, and imply security to a person to mitigate phobia stress.

SUMMARY OF INVENTION

This invention is directed to a cover for amusing and pacifying persons. More particularly, the invention is a security cover having a phosphorescent open pattern applied thereto which simulates a protected and shielded environment that emits light when subjected to light and subsequently located in a dark environment. The open spaces of the pattern contain fluorescent materials which reflect visible light when subjected to black or ultra violet light.

The cover has three visual appearances. When the cover is subjected to light having a broad electromagnetic spectrum of wavelengths of 3,800 to 7,200 Angstrom units, the total color and line appearance of the cover is sensed by the eye. When the cover is subjected to a narrow band of light frequencies or line spectrum of short wavelengths, known as black light, in a dark environment only parts of the cover having phosphorescent and fluorescent materials are visible. Colors in the blue and violet range are highlighted and sensed by the eye. When the cover is placed in a dark environment, the phosphorescent material is self illuminating so that the phosporescent pattern is visually sensed by the eye.

The cover has a sheet member, such as a fabric, having a visible surface. A protection pattern is anchored to the surface and extends over substantially the entire surface to establish a visual shield that creates imaginary protection. The pattern has phosphorescent material that when exposed to light and placed in a dark environment emits light for a period of time whereby the pattern is sensed by a person's eye. The pattern has open spaces containing fluorescent materials, such as dyes, pigments, paints, and inks, that reflect visible light when subjected to black light. The pattern, in one form of the invention, comprises elongated coordinated intersecting ribbons of phosphorescent material anchored to the sheet member. The ribbons make a grid that establishes a three dimensional visual shield that creates an image of protection for a person. The spaces between the ribbons contain fluorescent materials of one or more colors that reflects visible light in another shield arrangement when subjected to black light. The ribbons can be an arrangement of phosphorescent materials and fluorescent materials with the space between the ribbons covered with phosphorescent matrials. The pattern, in another form of the invention, comprises a regular spiral ribbon combined with radial spiral ribbons having a common center of phosphorescent material anchored to the sheet member. The spiral ribbon pattern establishes a three dimensional visual cone or a black hole design that has a shield-like image. The spaces between the spiral ribbons contain fluorescent materials of one or more colors that reflect visible light in another shield arrangement when subjected to black light. The pattern can be continuous or intermittent lines and shapes over the surface of a cover to provide a shield image.

In one embodiment of the invention, the cover comprises a generally rectangular blanket having a top sheet member. The top or exposed surface of the sheet member is coated with fluorescent material, such as fluorescent dyes, pigments, and paints, having one or more colors. A pattern of ribbons of phosphorescent material is anchored to the outer surface of the top sheet member over the fluorescent coating. The pattern has a plurality of intersecting ribbons of phosphorescent material, such as polyvinyl chloride plastisol ink or water based inks. The ribbons form a graphic representation of a three dimensional protection shield. In a dark room the pattern appears to pulsate between the two contour dimensions as the blanket is moved. The pulsating pattern creates an imaginary protective environment as viewed by the person under the blanket. The pattern has a plurality of diverging longitudinal ribbons and a set of transverse ribbons. The spacing between adjacent longituinal ribbons and adjacent transverse ribbons increases from the lower edge of the blanket to the upper edge. The longitudinal and transverse ribbons are alternately wide and narrow. The changes in the spacing of the adjacent ribbons and the differences in their thickness produces a three dimension image of a shield or protection pattern. Diverging right and left diagonal ribbons pass through the intersections of the longitudinal and lateral ribbons. The diagonal ribbons are alternately wide and narrow similar to the longitudinal ribbons. The spacing between adjacent right diagonal ribbons increases from the lower right corner of the blanket to the upper left corner. The spacing between adjacent left diagonal ribbons increases from the lower left corner of the blanket to the upper right corner. This increases the three dimension image of the protection pattern. The pattern of phosphorescent ribbons emits crossing lines of light providing a visual three dimensional image or shield. The fluorescent coating reflects visible light in generally triangular spaces to provide another visual three dimensional image or shield when subjected to black light.

Another embodiment of the invention has a cover with a sheet member having a surface coated with fluorescent material and regular and irregular spiral patterns of ribbons on the surface that intersect each other to form a three dimensional conical graphic representation of a protective shield. Regular spiral bands eminate from a center to the outer edges of the cover. The regular bands comprise a dominent or wide band and a narrow or recessive band located adjacent the dominent band. A second arrangement of spiral bands are superimposed on the regular spiral bands. The second bands are concentricaly centered with the regular bands and curve outwardly to intersect the regular bands form a generally parallelagram shaped spaces between the intersecting bands. The size of the spaces increase from the center of the sheet member to produce a three dimensional image of a shield or protection pattern. The alternate bands of the spiral arrangement of bands are wide and narrow. The bands are phosphorescent material ribbons secured to the surface of the sheet member. The phosphorescent material can be plastisol ink or a phosphorescent powder mixed with a base, such as plastisol or water. A metallic magnetic base, such as a ferrite base, can be secured to the sheet member to provide a permanent magnets that establish magnetic fields. The magnetic fields aid in the overcoming insomnia and other physiological and neurological conditions. The spaces between the ribbons are coated with fluorescent material which is visible when subjected to a narrow band of short wave length light frequency known as black light. The cover has three distinct spiral three dimensional appearances. When the cover is subjected to light having a broad electromagnetic spectrum of wave lengths of 3800 to 7200 angstrom units, the total color and line appearance of the cover is visible to the eye. When the cover is subjected to the narrow band of light frequencies in a dark environment the parallelogram like spaces and ribbons of the cover are visible. When the cover is placed in a dark environment, the phosphorescent material of the ribbons is self illuminating so that only the phosphorescent spiral pattern is visually sensed by the eye.

The invention includes a method of making a cover having a surface provided with a light emitting pattern an a fluorescent pattern. A sheet member, such as fabric, is made to the desired size and shape of the cover. The fabric is coated with fluorescent materials, such as dyes, pigments, or paints, by spray painting, silk screen painting or roller coating processes. The fabric is bleached along bands that depict the pattern to remove color from the fabric along the bands. Alternatively, a white under coat material is applied to the surface along the bands. Ribbons of phosphorescent material are applied to the fabric over the bands to cover the bands with phosphorescent material. The phosphorescent material is heat cured to anchor the phosphorescent material to the fabric whereby the phosphorescent material becomes permanently affixed to the fabric and provides a protection pattern that emits light when subjected to light and subsequently located in a dark environment. One type of phosphorescent material is a polyvinyl chloride plastisol ink having opague pigment. The material is applied to the fabric with a thickness of at least 2 mils to optimize its light emitting characteristics. The light from the phosphorescent material is visual through the bands when the color of the fabric has been removed so that there is light on both sides of the cover.

The cover and pattern of phosphorescent and fluorescent materials thereon has soothing and relaxation effects which aids insomnia affected persons. The geometric light patterns provide changing optical images that mitigates insomina. Mitigation of insomina enhances sound and consistent sleep of a person, including alpha sleep. Sleep promotes stabilized body metabolism which effectively reduces body weight. The reduction of human stress and fears increases quality content of dreams or pleasure dreams as opposed to nightmares. Magnetic materials used in the pattern establish magnetic fields also aids in overcoming insomina and other physiological and neurological conditions. The magnetic fields stablize a person's nerves, particulary persons afflicted with hypotension, neurosis, anaemia, and insomnia.

The ribbons of phosphorescent material being spaced from each other and intersecting each other create lighted grid and spiral patterns of graphic representations of relatively wide and deep visual protective environment shields. This visual environment mitigates a persons phobia fears, including nyctophobia, myxophobia, phasmophobia, teratophobia, and blennophobia. The light characteristics of the phosphorescent material and its pattern on substantially the entire external surface of at least one side of the cover enables a person to create light images with a flashlight and silhouettes of persons and objects on the cover. This provides the cover with novel entertainment and amusement features. The cover can be moved in the dark to create an action dome configuration and a back drop for action objects. The light from the phosphorescent material is visible from under the cover when the fiber fill or core has light transmitting features. A further feature of the cover is that it produces in a dark environment a soft and romantic light that can enhance spousal nocturnal relations. When black light is used the phosphorescent and fluorescent patterns are visible and creates light images that mitigate a persons fears. These and other objects and advantages of the covers of the invention are embodied in the following description and drawings.

DESCRIPTION OF PREFERRED EMBODIMENTS

Figure 1:
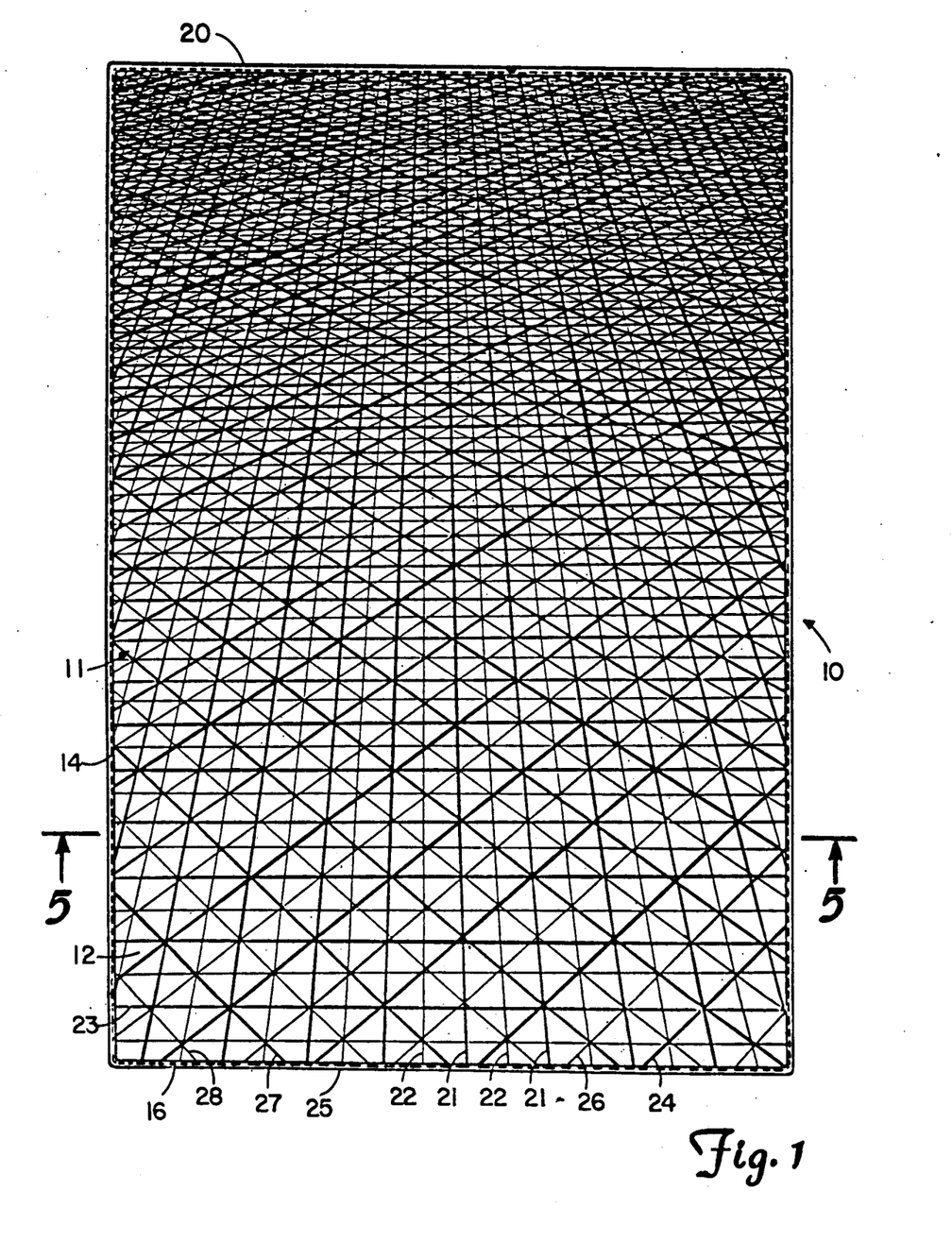
FIG. 1 is a top plan view of a cover having a phosphorescent and fluorescent patterns of the invention.
Figure 2:
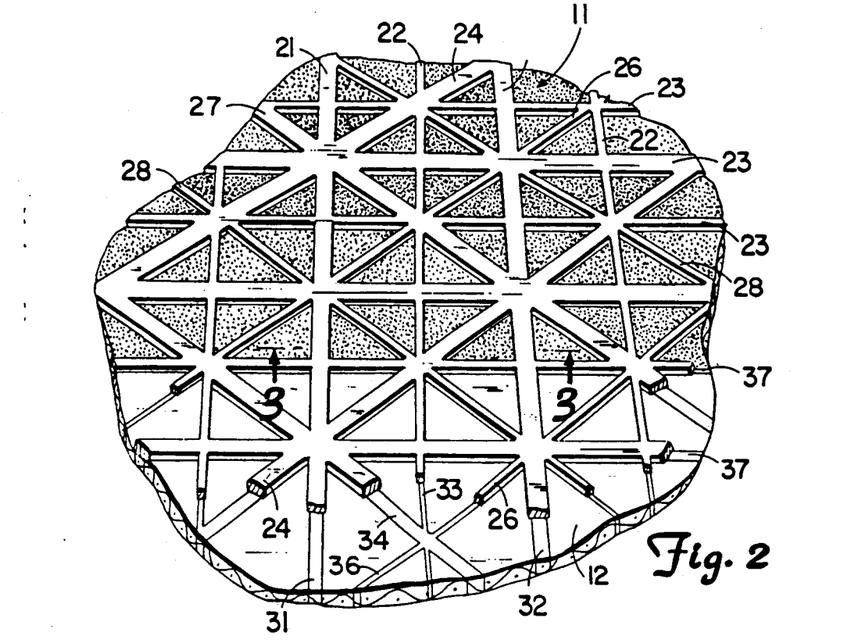
FIG. 2 is an enlarged perspective view of a portion of the cover of FIG. 1 with part of the surface layer between the bands removed to show the fluorescent coating and top surface of the base fabric.

Referring to FIGS. 1 to 2, there is shown a rectangular cover, indicated generally at 10 provided with a protection pattern, indicated generally at 11 as a grid. Cover 10 is a rectangular blanket or quilt useable as a bed covering for protection, concealment, and warmth. Cover 10 can be a cloth sheet, bedspread, coverlet, pillow case or like bedding. The cover of the invention can take other forms, shapes, and uses such as wall coverings, drapes, curtains, floor coverings, rugs, clothing, sleepwear, sheets, pillow cases, textiles as well as works of art. The following description is directed to a cover having the form of a blanket.

Protection pattern 11 covers substantially the entire top surface of cover 10. Pattern 11 has a three dimensional shield image to provide a relatively wide and deep visual protection environment that has beneficial effects on persons afflicted with nyctophobia. Mitigation of insomnia enhances sound and consistent sleep of a person, including alpha sleep. Sleep promotes stabilized body metabolism which effectively reduces body weight. The reduction of human stress and fears increases quality content of dreams or pleasure dreams as opposed to nightmares. Protection pattern 11 also has beneficial attributes for other fears or phobias, such as myxophobia, phasmophobia, teratophobia, and blennophobia. The fundamental quality of fear is rooted in a relationship to a force, power, or person that is perceived to be threatening. This behavorial fear can be masked and mitigated with the appropriate therapeutic use of cover 10 and its protection pattern 11.

Cover 10 has fascinating entertainment and amusement characteristics in addition to its phobia treatment shield. A person can draw designs on the cover with the use of a flashlight. The light emanating from the flashlight will energize the phosphorescent material of the grid so that in an dark environment, the created image will be visible. Silhouettes of persons and objects can be made on the cover by masking portions of the cover so that in the dark environment only the phosphorescent material that is exposed to light will produce a visible image. The pattern of phosphorescent material produces in a dark environment a night light that has soft and romantic characteristics and aphrodisiac atmosphere is established which enhances nocturnal domestic spouse relations. Cover 10 can be changed to a dome configuration to establish a pulsating light which is visible from under the cover as well as the top of the cover. The light emitted by the protective pattern in a dark environment gradually diminishes. This creates a relaxing and soothing effect which is beneficial to persons afflicted by insomnia. The top surface of cover 10 is coated with fluorescent material 42, such as fluorescent dyes, paints, or pigments. Material 42 can be applied to the fabric by spray painting, silk screen printing or roller coating processes.

Cover 10 has a top fabric or sheet member 12 on which pattern 11 is anchored. Pattern 11 extends over substantially the entire top surface of the fabric 12. Fabric 12 is located over a bottom fabric or sheet member (not shown) to form the opposite side of cover 10. A border band 14 is attached with stitches 16 to the outer adjacent outer peripheral edges of top and bottom fabrics. Border band 14 can have a generally transversed U-shaped cross section with stitches 16 securing the upper and lower portions of band 14 to the outer peripheral overlapping and engaging edges of top and bottom fabrics. The outer peripheral edges of fabrics can be hemmed to provide a finished border made by folding back the fabric and sewing it down. An ornamental border fringe or galloon can be secured to the outer peripheral edge of cover 10. Other types of fasteners and connectors can also be used to attach the outer edges of the fabrics. Cover 10 can be single flat sheet of fabric, cloth or plastic material.

Referring to FIGS. 1 and 2, protection pattern is a shield grid comprising a plurality of laterally spaced longitudinal ribbons 21 of phosphorescent material. The ribbons converge outwardly from each other starting from the lower edge of cover 10 as seen in FIG. 1. The center ribbon 21 is located linearly along the center line of fabric 12. First longitudinal ribbons 21 are coordinated with a plurality of second longitudinal ribbons 22. The second ribbons 22 have a width that is smaller than the width of the first ribbons 21 to produce a diminishing or recessive effect relative to the dominant ribbons 21. The width of the second ribbons 22 is about one half of the width of dominant ribbons 21. Ribbons 22 are interposed between the ribbons 21 and taper in an inwardly direction from the first or bottom edge 20 to the second or top edge 25 of cover 10. The pattern includes a plurality of transverse ribbons 23. The ribbons 23 extend laterally across the fabric 12. The lateral spacing between adjacent ribbons 23 decreases from first edge 20 to second edge 25 of cover 10. The spacing progressively decreases between the adjacent transverse ribbons 23 to provide protection grid 11 with visual longitudinal depth and a three dimensional image.

Protection pattern 11 includes right and left diagonal lines 24, 26 and 27, 28 that pass through the intersections of the longitudinal and transverse ribbons 23 and 21 respectively. Right diagonal ribbons include a first wide ribbon 24 and a second narrow ribbon 26. The wide narrow pattern of the ribbons 24 and 26 is repeated from the lower right corner of cover 10 to the upper left corner of cover 10. The left diagonal ribbons 27 and 28 commence at the lower right corner of cover 10 and progressively increase in the spaced relation with each other to the upper left corner of cover 10. The left diagonal ribbons pass through the intersections between longitudinal ribbons 21 and 22 and transverse ribbon 23.

Protection pattern 11 has a first generally rectangular coordinated ribbon pattern comprising the diverging longitudinal ribbons 21 and 22 and the general transverse ribbon 23. The spacing between the respective longitudinal ribbons and the respective transverse ribbons decreases from the first edge 20 of cover to second edge 25 thereof. The second and third diagonal patterns of ribbons are generally normal to each other and are superimposed on the first rectangular coordinated ribbon pattern. The changes in the spacing of the first and second coordinated ribbon patterns and the differences in the thicknesses of the adjacent ribbons produces a three-dimensional image of a shield or protection pattern.

Referring to FIG. 2, the ribbons of phosphorescent material are anchored to fabric 12. The thickness of each ribbon is between 2 and 3 mils. to optimize its light emitting characteristics. The phosphorescent material can be a polyvinyl chloride plastisol ink or a water based ink. One type of phosphorescent material is a polyvinyl chloride resin that includes phosphorescent pigment, preferably yellow-green in color to provide the phosphorescent material with opague characteristics. The phosphorescent material can have color additives to produce color such as red, green, blue, yellow and the like. The polyvinyl chloride phosphorescent material is flexible, non-inflamable and non-toxic after it is heat cured and bonded to fabric 12. The polyvinyl chloride and pigments and phosphorescent material contained therein are biologically inert as they do not irritate skin tissue nor are they prone to protein build-up that can produce a skin reaction. The phosphorescent material can be a phosphorescent powder which is added to a base plastisol or base water. The mixture is a phosphorescent ink. The phosphorescent material is permanently affixed to fabric 12 and does not dissolve in water and bleach solution used to wash and/or clean cover 10. The phosphorescent material also does not deteriorate over the life of cover 10.

Phosphorescent powder can be added to a metallic magnetic plastic base, such as a ferrite base, to provide the cover with linear permanent magnets. Other types of magnetic materials, such as magnetic strips, can be mounted on the fabric. The magnets establish magnetic fields that aid recovery from fatigue and adjustment of the functions of human organs. The magnetic fields with flux density over 500 gauss stablize a person's nerves, particulary, those afflicted with hypotension, neurosis, anaemia, and insomnia. Mitigation of insomnia enhances sound and consistent sleep of a person, including alpha sleep. Sleep promotes stabilized body metabolism which effectively reduces body weight. The reduction of human stress and fears increases quality content of dreams or pleasure dreams as opposed to nightmares. Magnetic fields can be effective to mitigate joint stiffness, spinal cord and waist pains, prostration, habitual headaches, muscle spasms, and imbalance of the autonomic nerves. The reduction of these stresses alleviates insomnia and enhances rejuvenation and revitalization of the human body.

A method of making cover 10 is described as follows. A sheet member or fabric 12 having color means such as dye and natural colors, such as ecru, found in natural fibers, is made to a selected size and shape of the final cover. The top surface of cover 10 is coated with fluorescent material 42, such as fluorescent dyes, paints, pigments. Material 42 can be applied to the fabric by spray painting, silk screen printing or roller coating processes. The color materials, such as dyes and the like, are removed from the fabric along longitudinal bands 31, 32, and 33 and diagonal bands 34 and 36, as well as transverse bands 37 for the longitudinal, diagonal and transverse ribbons. The color materials can be covered with a white under coat material along all the bands of the pattern 11. The bands are in the format pattern 11 of the phosphorescent material that is applied to fabric 12. Each of the bands, as shown in FIG. 2, has a width that is less than the width of the ribbon that covers the band. The ribbons have lateral edges that extend beyond the sides of the bands so as to completely cover the bands. The overlapping relationship between the ribbons and the bands also allows for manufacturing tolerances in that the bands do not have to be precisely located on fabric 12 to cover the bands. When the coloring materials have been removed from fabric 12, the phosphrescent material of the ribbons will emit light and penetrate fabric 12 as indicated by arrow 38 in FIG. 3. The light passes through fabric 12 and is visible from the underside of cover 10. The removal of the color materials from bands 12 also enhances the light or glow or light emitting characteristics of the phosphorescent material. When the phosphorescent material is placed over a fabric having dyes, its light emitting characteristics are diminished. This is overcome when white under coat material is placed on the fabric. As shown in FIG. 2, arrows 39 show the enhanced light emission from phosphorescent material 21 and arrows 41 indicate the diminished light emitting characteristics. The differences in the light intensity of the fluourscent ribbon 21 produces a rail or tube visual image. On movement of cover 10 the light emitted by the ribbons, create an illusion of surging or pulsating light energy.

The color means, such as dyes, ecru, and other materials that inhibit the passage of light through the fabric 12 are removed by a bleaching process. Chemical agents can be used to bleach the fabric along the bands by eithr oxidation or reduction. Bleaching powders, such as chlorinated lime or calcium hypochlorite can be used as bleach solutions. Light, such as intense sunlight and laser light can be used to remove the color means from fabric 12 along the pattern bands. Subsequent to the bleaching process, fabric 12 can be cleaned or washed to remove all bleaching agents. Alternatively, the bleaching agents can be neutralized. Drum applicators can be used to apply the bleaching agent to fabric 12 along the selected pattern lines to produce the colorless bands.

The sheet member or fabric 12 is then placed in a generally flat position for the application of the ribbons of phosphorescent material. A flat bed silk screen process is used to emboss the polyvinyl chloride plastisol ink on the fabric in accordance with protective pattern 11. Other processes can be used to apply the ink to the fabric. The ribbons of phosphorescent material have a thickness of 2 to 3 mils. Preferably, the ribbons have a thickness of at least 2 mils to enhance the light emitting characteristics of the phosphorescent material. The ribbons of phosphorescent material may be applied to the fabric 12 by other methods such as spraying, air brush, silk screen, painting, or stamping.

After the ribbons of phosphorescent material have been applied to fabric 12, the phosphorescent material is heat cured. The phosphorescent material during the curing, anchors or bonds to the fabric. The curing can be accomplished with heaters, including infrared light.

Cover 10 is completed into a blanket or quilt by a core (not shown) between the top and bottom fabrics. Border band 14 is then stitched to the outer peripheral edges of the fabrics. Ties can be inserted through the fabrics and core and tied with knots. Appropriate bedding labels are affixed to the cover during the construction thereof.

Figure 3:
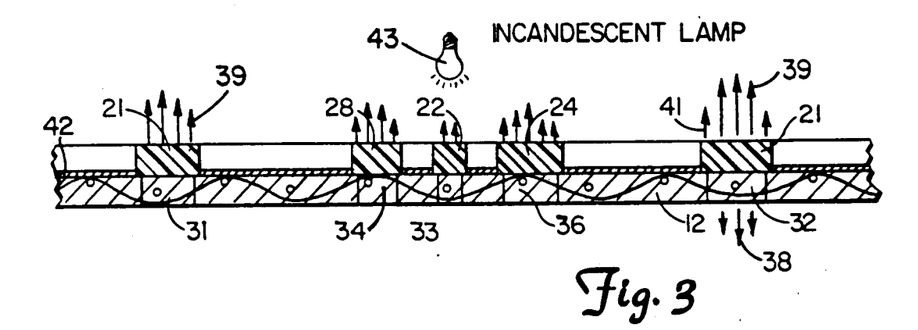
FIG. 3 is an enlarged sectional view taken along line 3—3 of FIG. 2 of the cover subjected to light from an incandescent lamp.

In use, as shown in FIG. 3 when the cover is subjected to the light from a incandescent lamp 43 light energy will activate the phosphorescent material in ribbons 21-24 and 26-28. When the cover is placed in the dark environment light indicated by arrows 39 will emanate from ribbons 21-24 and 26-28. This light is visible to the human eye. The spaces between the ribbons will be dark and may be faintly visible from the reflection from the light 39. When the color material has been removed from fabric 12, light indicated by arrows 38 is visible from under cover 10.

Figure 4:
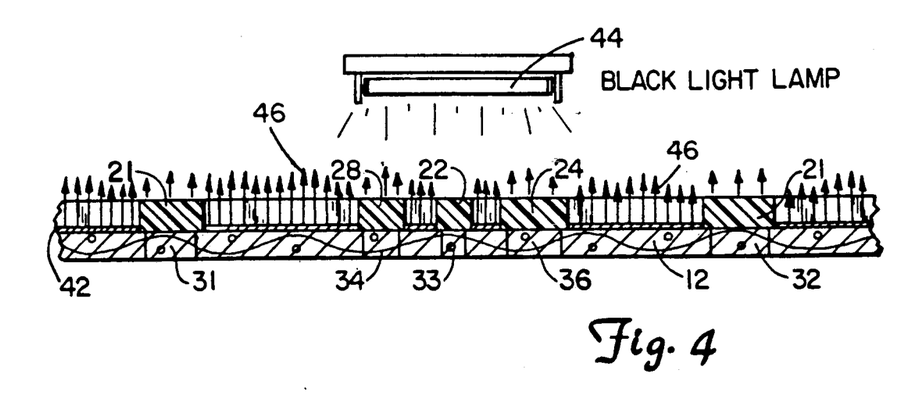
FIG. 4 is a sectional view similar to FIG. 3 with the cover subjected to black light lamp.

Referring to FIG. 4, when cover 10 is subjected to the light from a black light lamp 44, the fluorescent material 42 will reflect light 46 which can be sensed by the human eye. The phosphorescent ribbons 21-24 and 26-28 emit light as they are activated by the light from black lamp 44. The color of ribbons 21-24 and 26-28 contrasts with the color of the fluorescent material 42.

Cover 10 has three visual distinct visual appearances. When cover 10, shown in FIG. 1, is located in a light environment having a broad spectrum, such as daylight, the total color and line appearance and spiral pattern of the cover is visible to the eye. When the cover is subjected to a narrow band of light frequencies such as the black light lamp, shown in FIG. 4, in a darkened environment the fluorescent spaces of the cover between the bands are visible and the phosphorescent material emits light that contrasts in color from the color of light reflected from the fluorescent material. The colors of the blue and violet range of fluorescent material 126 are highlighted to provide a pattern creating a protective encironment. When cover 10 is placed in a dark environment after it has been subjected to either an incandescent light or daylight, or black light the phosphorescent material of the ribbons is self illuminating so that only pattern 11 is visually sensed by the eye. Pattern 11 will be sustained in the darkness for a period of time. A magnetic material used in associates with the ribbons 21-24 and 26-28 establish magnetic fields that aid in recovery of physiological and neurological conditions, such as fatigue and adjustment of the functions of human organs. When flux densities of over 500 gauss are present there is a stabilization of a persons nerves, particularly conditions relating to hypotension, neurosis, anaemia and insomnia. Appropriate magnetic fields can be effective to mitigate joint stiffness, spinal cord and waist pains, prostration, habitual headaches, muscular spasms, and imbalance of the autonomic nerves. The result is enhances rejuvination and revitalization of the human body. Mitigation of insomina enhances sound and consistent sleep of a person, including alpha sleep. Sleep promotes stabilized body metabolism which effectively reduces body weight. The reduction of human stress and fears increases quality content of dreams or pleasure dreams as opposed to nightmares.

Referring to FIGS. 5 to 8, there is shown a modification of the cover of the invention indicated generally at 100 having a protection pattern indicated generally at 111 as a spiral grid. Cover 100 is a rectangular sheet member which can be used in the manner of use of cover 10. Pattern 111 covers substantially the entire top surface of cover 100. Pattern has a three dimensional shield image having a center that has infinite visual depth that provides irrelatively wide and deep visual protection environment. The environment can have beneficial effects on persons inflicted with nyctophobia. Pattern 11 has also beneficial attributes to other human fears or phobias as described herein with respect to pattern 11. Pattern 111 also has entertainment and amusement characteristics of pattern 11.

Figure 5:
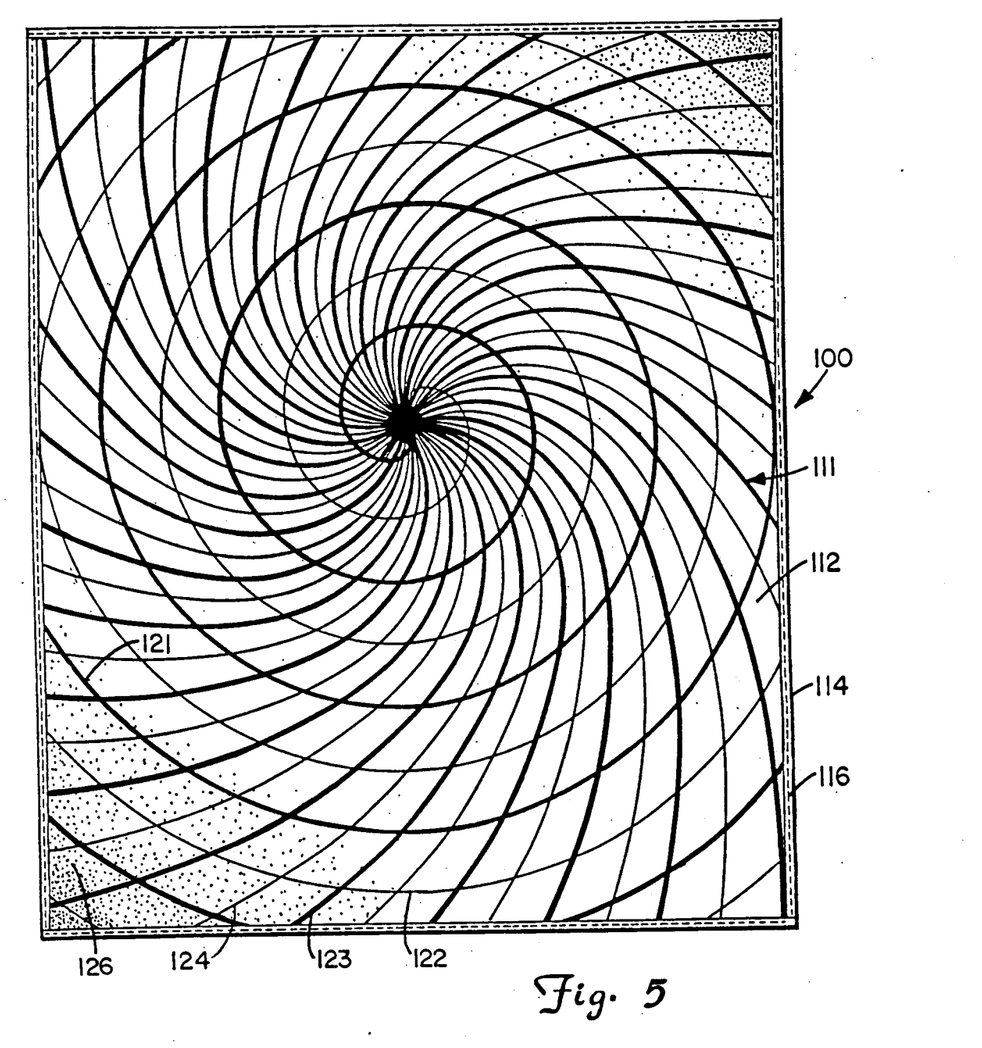
FIG. 5 is a top plan view of a modification of the cover having a phosphorescent and fluorescent spiral patterns of the invention.

Cover 100 has a base sheet member or fabric 112 having a top surface for pattern 111. The outer peripheral edge of fabric 112 has a border band 114 secured to fabric 112 with stiches 116. Other types of structures can be used to secure border band 114 to the outer pheripheral edges of fabric 112. An ornamental border fringe or galloon can be attached to the fabric 112.

Pattern 111 is a shield spiral grid comprising a first ribbon longitudinal arrangement having a plurality of first spiral ribbons 121 and 122 eminating from the center of fabric 112. Ribbon 121 is a wide dominant ribbon that continuously turns to the outer edges of fabric 112. Ribbon 122 interposed between ribbon 121 is a narrow or recessive ribbon that complements dominant ribbon 121. A second ribbon latitudinal arrangement comprising a dominant ribbons 123 and recessive ribbons 124 emanate from the center of fabric 112.

Figure 6:
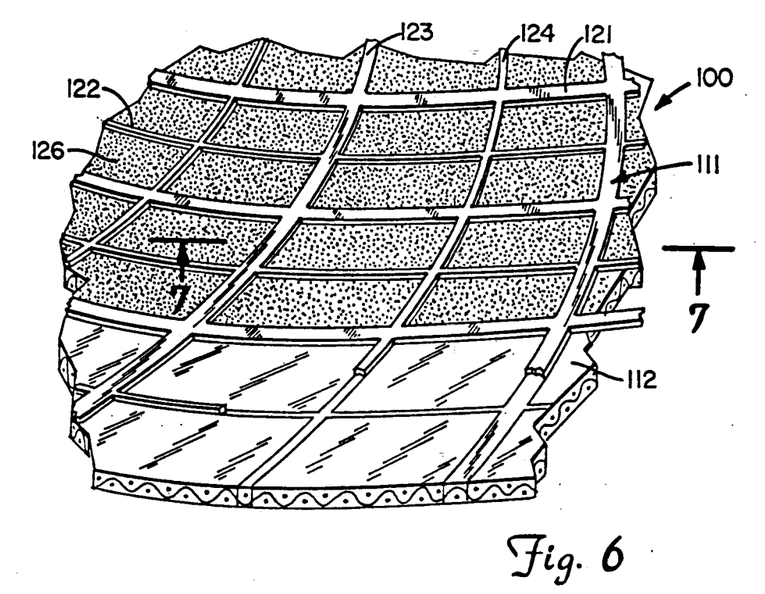
FIG. 6 is an enlarged perspective view of a portion of the cover of FIG. 5 with part of the surface layer between the bands removed to show the fluorescent coating and top surface of the base fabric.
Figure 7:
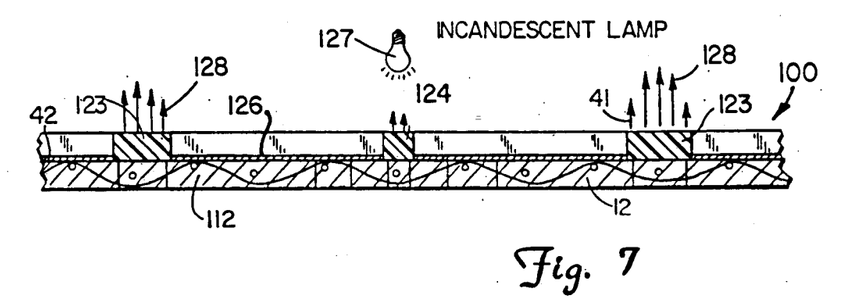
FIG. 7 is an enlarged sectional view taken along line 7—7 of FIG. 6 with the cover subjected to light from an incandescent lamp.
Figure 8:
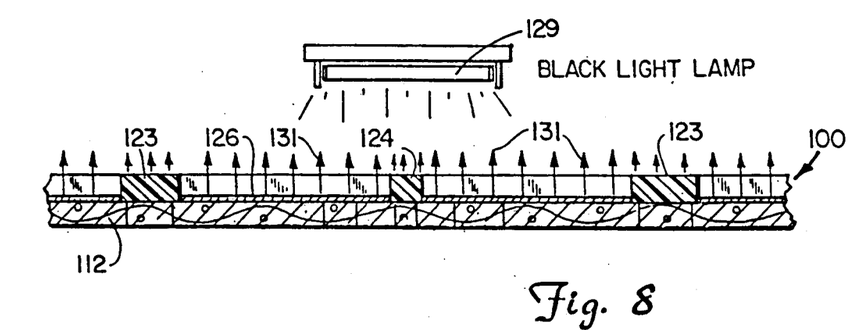
FIG. 8 is a sectional view similar to FIG. 7 with the cover subjected to light from a black light lamp.

As shown in FIGS. 6 to 8, the generally parallelogram spaces between the intersecting ribbons 121-124 are covered with a layer of fluorescent material 126 such as ink, that reflect light in the ultra violet or black light range that is visible to the human eye. Fluorescent material 126 can be a single color or a plurality of colors. Material 126 is applied to fabric 112 by spray painting, silk screen printing, or roller coating processes.

In use, as shown in FIG. 7 when cover 100 is subjected to the light from a incandescent lamp 127 light energy will activate the phosphorescent material in ribbons 121-124. When the cover is placed in the dark environment light indicated by arrows 128 will eminate from ribbons 121-124. This light is visible to the human eye. The spaced between the ribbons will be dark and may be faintly visible from the reflection from the light 128.

Referring to FIG. 8, when cover 100 is subjected to the light from a black light lamp 129, fluorescent material 126 will reflect light 131 which can be sensed by the human eye. Phosphorescent ribbons 121-124 emit light as they are activated by the light from black lamp 129. The color of the phosphorescent ribbons 121-124 sharply contrasts with the color of the light reflected from fluorescent material 126.

Cover 100 has three distinct visual appearances. When cover 100, shown in FIG. 5, is located in a light environment having a broad spectrum, such as daylight, the total color and line appearance and spiral pattern of the cover is visible to the eye. When the cover is subjected to a narrow band of light frequencies such as the black light lamp, shown in FIG. 8, in a darkened environment the fluorescent spaces of the cover between the bands are visible and the phosphorescent material emits light that contrasts in color from the color of the light reflected from the fluorescent material. The colors of the blue and violet range of fluorescent material 126 are highlighted to provide a rectangular spiral pattern creating a protective environment. When cover 100 is placed in a dark environment after it has been subjected to an incandescent light or daylight, or black light the phosphorescent material of the ribbons is self illuminating so that only spiral pattern 111 is visually sensed by the eye. This spiral pattern will be sustained in the darkness for a period of time. A magnetic material used in associates with ribbons 121-124 establish magnetic fields that aid in recovery of physiological and neurological conditions, such as fatigue and adjustment of the functions of human organs. When flux densities of over 500 gauss are present there is a stabilization of a persons nerves, particularly conditions relating to hypotension, neurosis, anaemia and insomnia. Appropriate megnetic fields can be effective to mitigate joint stiffness, spinal cord and waist pains, prostration, habitual headaches, muscular spasms, and imbalance of the autonomic nerves. The result is enhanced rejuvination and revitalization of the human body. Mitigation of insomina enhances sound and consistent sleep of a person, including alpha sleep. Sleep promotes stabilized body metabolism which effectively reduces body weight. The reduction of human stress and fears increases quality content of dreams or pleasure dreams as opposed to nightmares.

Figure 9:
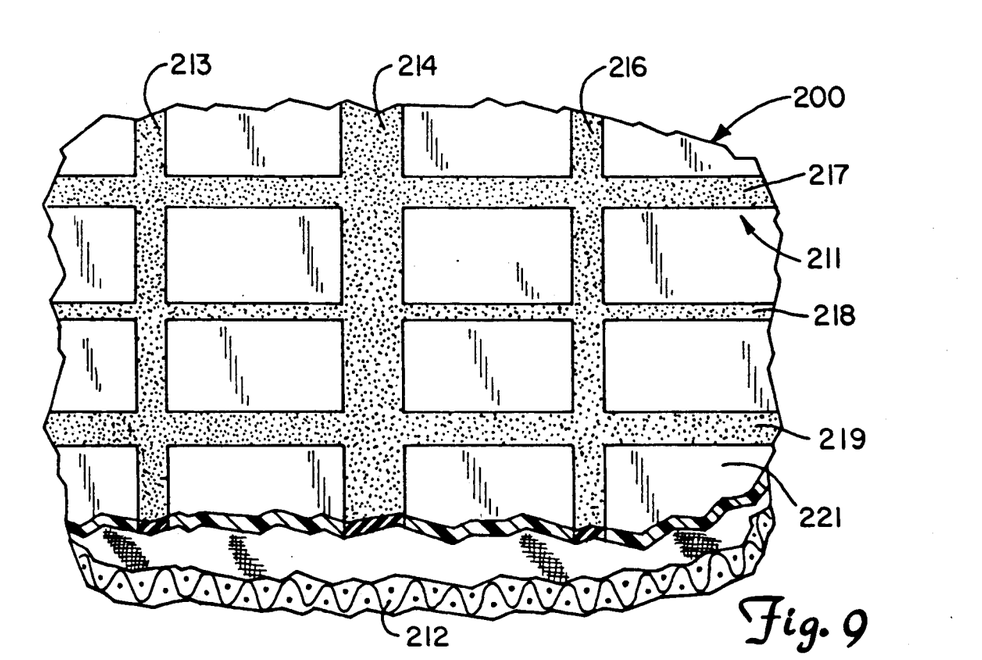
FIG. 9 is a plan view of a portion of another modification of the cover of the invention.

Referring to FIG. 9 there is shown a second modification of the cover of the invention indicated generally at 200 having a protection pattern indicated generally at 211 as a rectangular grid. Cover 200 is rectangular sheet member which can be used in the manner of cover 10. Pattern 211 covers substantially the entire top surface of a base member or fabric 211 to produce a three dimensional shield image. Pattern 211 comprises a plurality of generally parallel vertical ribbons 213, 214, and 216. The ribbons 213, 214 and 216 can have varying widths. For example, ribbon 214 can be twice the width of ribbon 213. A plurality of laterally spaced transverse ribbons 217, 218, 219 are attached to fabric 211 to complete the rectangular grid pattern 211. Ribbons 213, 214, 216 to 219 are fluorescent material, such as fluorescent dyes, paints, or pigments. The fluorescent material can be applied to fabric 212 along predetermined lines by spray painting, silk screen printing, or roller coating processes. The spaces between adjacent ribbons contain phosphorescent material which emits light in a dark environment. The phosphorescent material can be a polyvinyl chloride resin that includes phosphorescent pigment. The phosphorescent material can be a phosphorescent powder added to a base, such as plastisol or water. This mixture is a phosphorescent ink. The phosphorescent material can be applied to the surface of fabric 212 with a silk screen process. After the phosphorescent material has been applied to fabric 212 the material is heat cured. The curring of the phosphorescent material anchors or bonds it to the surface of fabric 212.

When the cover 200 is subjected to a light from an incandescent lamp or sunlight the light energy will activate the fluorescent material in the squares between adjacent ribbons 213, 214, and 216 to 219. When cover 200 is placed in a dark environment light will emanate from the squares to produce a generally checkerboard or rectangular coordinated pattern of square lighted surfaces which are visible to the human eye. The lines indicated by ribbons 213, 214 and 216 to 219 do not reflect light since they are in a dark environment.

When cover 200 is subjected to light from a ultra violet or black light lamp, fluorescent materials in ribbons 213, 214, and 216 to 219 will reflect light which is sensed by the human eye. The phosphorescent material 221 in the squares emits light as it is activated by the light from the black lamp. The color of the phosphorescent material contrasts with the color of the fluorescent material to produce at least a two colored pattern 211 under black light conditions.

Figure 10:
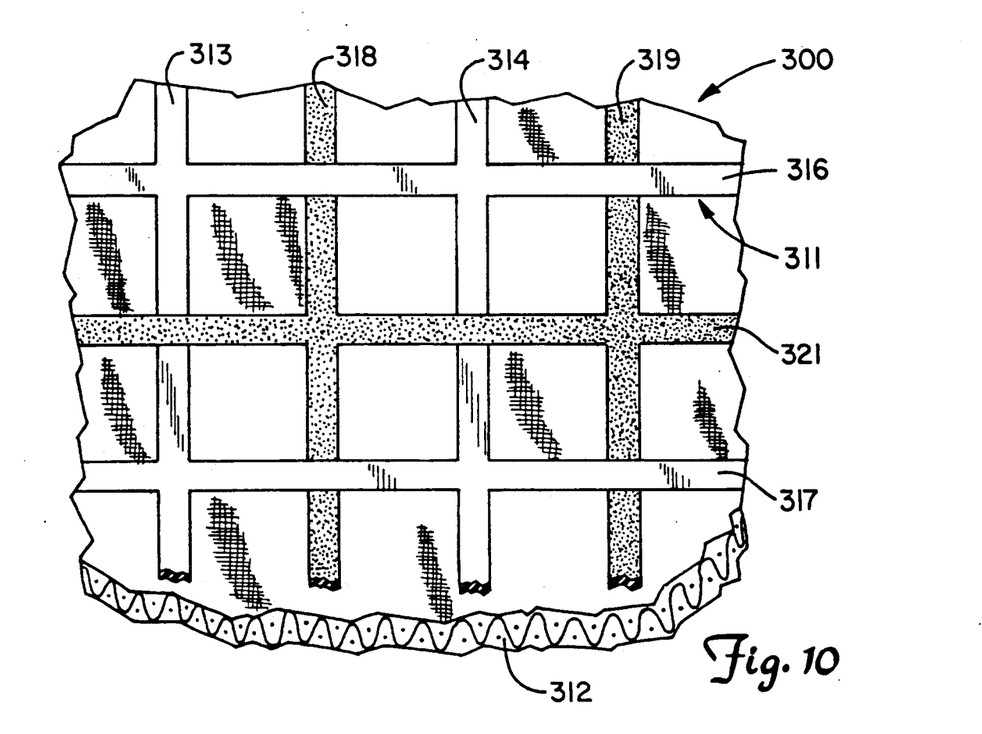
FIG. 10 is a plan view of a portion of a further modification of the cover of the invention.

Referring to FIG. 10, there is shown a third modification of the cover of the invention indicated generally at 300 having a generally rectangular coordinated pattern 311. The pattern 311 is secured to top surface of a fabric or sheet member 312 to form a shield like image.

Pattern 311 has a first cartesian arrangement of ribbons 313, 314, 316, and 317 to form a generally square pattern. The ribbons 313, 314, 316, and 317 are phosphorescent material which will emit light when located in a dark environment. The phosphorescent material is herein described with respect to cover 10. The pattern 311 has a second cartesian arrangement of ribbons 318, 319, and 321 that are located in a rectangular arrangement superimposed with respect to the ribbons 313, 314, 316, and 317. Ribbons 318, 319 and 321 are linear fluorescent materials such as the fluorescent material 42 with respect to cover 10. When cover 300 is subjected to ultra violet or black light the fluorescent material of ribbons 318, 319 and 321 will reflect light visible to the human eye. The phosphorescent material in ribbons 313, 314, 316, and 317 emit light that contrasts in color from the color of the light reflected by the phosphorescent material thereby provide a two color rectangular coordinated pattern on the top surface of fabric 312.

Magnetic materials can be included in the ribbons of the covers 200 and 300. The magnetic materials can be incorporated into magnetic strips secured to the fabric. The magnetic strips provide magnets that establish magnetic fields that aid in the recovery of fatigue and adjustment of the functions of human organs is herein described.

While there has been shown and described preferred embodiments of the cover of the invention it is understood that changes in the size, materials, protective patterns, and the methods of applying phosphorescent and fluorescent materials to the fabric may be made by those skilled in the art without departing from the invention. For example, the ribbons of phosphorescent material may be dashed or interrupted or a series of in-lined dots or squares to form the protective pattern on the fabric. The invention is defined in the following claims.

I claim:

1. A cover comprising: a sheet member having a surface and an outer peripheral edge, and protection pattern means anchored to the surface of the sheet member and extended over substantially the entire surface of said sheet member, said pattern means comprising a plurality of ribbons of phosphorescent material that emits light when subjected to light and subsequently located in a dark environment, said ribbons of phosphorescent material being spaced from each other and located over substantially the entire surface of the sheet member whereby when the sheet member is exposed to a lighted environment and subsequently to a dark environment the phosphorescent material emits light creating a lighted pattern of a graphic representation of a relatively wide and deep visual shield like image, and fluorescent material attached to the sheet member in the spaces between the ribbons, said fluorescent material reflecting visible light and said phosphorescent material emitting visible light when subjected to black light.

2. The cover of claim 1 wherein: the ribbons of phosphorescent material include a plurality of first linear ribbons and a plurality of second linear ribbons positioned at an angle relative to the first linear ribbons.

3. The cover of claim 2 wherein: the first linear ribbons are laterally spaced from each other, and said second ribbons are laterally spaced from each other, said first and second ribbons intersecting each other and providing spaces between adjacent ribbons.

4. The cover of claim 3 wherein: alternate ribbons of said first and second ribbons have different widths.

5. The cover of claim 1 including: magnet means associated with the ribbons for establishing magnetic forces to mitigate physiological and neurological conditions of a human body.

6. The cover of claim 5 wherein: the magnetic means comprise permanent magnet means.

7. The cover of claim 1 wherein: the ribbons of phosphorescent material include a plurality of first ribbons and a plurality of second ribbons, said first and second ribbons located generally normal to each other, and a plurality of third right diagonal ribbons and a plurality of fourth left diagonal ribbons passing through the intersections of the first and second ribbons.

8. The cover of claim 1 wherein: the ribbons of phosphorescent material include a plurality of first ribbons and a plurality of second ribbons, said cover has a first edge and a second edge opposite the first edge; said first ribbons extending between said first and second edges and converging relative to each other from the first edge to the second edge of the cover.

9. The cover of claim 1 wherein: the ribbons of phosphorescent material include a plurality of first ribbons and a plurality of second ribbons, said cover has a first edge and a second edge opposite the first edge, said second ribbons extended generally parallel to the first edge, the lateral spacing between adjacent second ribbons decreasing from the first edge to the second edge of the cover.

10. The cover of claim 9 wherein: the first ribbons extend between said first and second edges and converge relative to each other from the first edge to the second edge of the cover.

11. The cover of claim 9 wherein: the alternate ribbons of the first and second ribbons have different widths with one width being about one half the other width.

12. The cover of claim 1 wherein: the ribbons of phosphorescent material include a plurality of first spiral ribbons having a generally longitudinal arrangement on the sheet member and a plurality of second spiral ribbons having a generally latitudinal arrangement on the sheet member, said second spiral ribbons intersecting said first spiral ribbons and providing spaces between adjacent ribbons.

13. The cover of claim 12 including: magnet means attached to the sheet member for establishing magnetic forces which mitigate physiological and neurological conditions of the human body.

14. The cover of claim 12 including: magnet means associated with the ribbons for establishing magnetic forces which mitigate physiological and neurological conditions of the human body.

15. The cover of claim 14 wherein: the magnet means comprise permanent magnet means.

16. The cover of claim 12 wherein: alternate ribbons of the first and second spiral ribbons have different widths.

17. A cover comprising: a member having a top surface, a plurality of intersecting ribbons of phosphorescent material anchored to said surface, said ribbons being spaced from each other and extended over substantially the entire top surface of the member and forming a pattern thereon having a graphic representation of a shield whereby when the member is subjected to a lighted environment and subsequently to a darkened environment, the ribbons emit light creating an imaginary protective environment, and fluorescent means between the spaced ribbons attached to the member operable to reflect visible light when subjected to light in the ultra violet wavelength image.

18. The cover of claim 17 wherein: the phosphorescent material is polyvinyl chloride plastisol ink.

19. The cover of claim 17 wherein: the ribbons of phosphorescent material include a plurality of first linear ribbons and a plurality of second linear ribbons positioned to an angle relative to the first linear ribbons and intersecting said first ribbons.

20. The cover of claim 19 wherein: the first and second ribbons are generally normal to each other, and a plurality of third right diagonal ribbons, and a plurality of fourth left diagonal ribbons, said third and fourth ribbons passing through the intersections of the first and second ribbons.

21. The cover of claim 20 wherein: the alternate ribbons of the first and second ribbons have different widths, the width of one ribbon being about one half the width of the other ribbon.

22. The cover of claim 17 including: magnet means associated with the ribbons for establishing magnetic forces which mitigate physiological and neurological conditions of a human body.

23. The cover of claim 22 wherein: the magnetic means comprise permanent magnet means.

24. The cover of claim 17 wherein: the ribbons of phosphorescent material include a plurality of first spiral ribbons having a general longitudinal arrangement on the member and a plurality of second spiral ribbons having a generally latitudinal arrangement on the member, said second ribbons intersecting said first spiral ribbons and providing spaces between adjacent ribbons.

25. The cover of claim 24 wherein: alternate ribbons of the first and second spiral ribbons have different widths.

26. A cover comprising: a sheet member having a surface, a plurality of first means of phosphorescent material anchored to and located over substantially the entire surface to form a shield-like image thereon whereby when the cover is exposed to a lighted environment and subsequently to a dark environment the phosphorescent material admits light creating a relatively wide and deep light shield-like image, and second fluorescent means secured to the sheet member spaced from the first means, said second fluorescent means reflecting visible light and said phosphorescent material emitting visible light when subjected to light in the ultra violet wavelength range.

27. The cover of claim 26 including: magnet means associated with the sheet member for established magnetic forces which mitigate physiological and neurological conditions of a human body.

28. The cover of claim 27 wherein: the magnet means comprise permenent magnet means.

29. The cover of claim 26 wherein: the first means comprise elongated ribbons, alternate ribbons having different widths.

30. The cover of claim 26 wherein: the first means includes a plurality of first spiral means having a generally longitudinal arrangement on the sheet member and a plurality of second spiral means having a generally latitudinal arrangement on the sheet member, said second spiral means intersecting said first spiral means and providing spaces between adjacent ribbons.

31. The cover of claim 30 wherein: the second means comprises fluorescent means attached to the sheet member in the spaces between adjacent spiral ribbon means operable to reflect visible light when subjected to light in the ultra violet wavelength range.

32. The cover of claim 30 including: magnet means associated with at least one of the spiral means for establishing magnetic forces which mitigate physiological and neurological conditions of a human body.

33. The cover of claim 32 wherein: the magnet means comprises permanent magnet means.

34. The cover of claim 30 wherein: the first and second spiral means comprise a plurality of ribbons, and alternate ribbons having different widths.

35. A cover comprising: a sheet member having a surface and an outer peripheral edge, and protection pattern means anchored to the surface of the sheet member and extended over substantially the entire surface of said sheet member, said pattern means comprising a plurality of ribbons of phosphorescent material that emits light when subjected to light and subsequently located in a dark environment, said ribbons of phosphorescent material being spaced from each other and located over substantially the entire surface of the sheet member whereby when the sheet member is exposed to a lighted environment and subsequently to a dark environment the phosphorescent material emits light creating a lighted pattern of a graphic representation of a relatively wide and deep visual protective environment shield that mitigates a person's fears including nycotophobia, myxophobia, phasmophobia, teratophobia, and blennophobia, said ribbons of phosphorescent material include a plurality of first linear ribbons and a plurality of second linear ribbons positioned at an angle relative to the first linear ribbons, said first linear ribbons being laterally spaced from each other, said first and second ribbons intersecting each other and providing spaces between adjacent ribbons; and fluorescent means attached to the sheet member in the spaces between the adjacent ribbons operable to reflect visible light when subjected to light in the ultra violet wavelength range.

36. The cover of claim 35 including: magnet means associated with the ribbons for establishing magnetic forces which mitigate physiological and neurological conditions of a human body.

37. The cover of claim 36 wherein: the magnet means comprise permanent magnet means.

38. The cover of claim 35 wherein: the first and second ribbons are generally normal to each other, and a plurality of third right diagonal ribbons and a plurality of fourth left diagonal ribbons passing through the intersections of the first and second ribbons.

39. The cover of claim 38 wherein: the alternate ribbons of the first and second ribbons have different widths with one width being about one half the other width.

40. The cover of claim 35 wherein: the ribbons of phosphorescent material include a plurality of first spiral ribbons having a generally longitudinal arrangement on the sheet member and a plurality of second spiral ribbons having a generally latitudinal arrangement on the sheet member, said second spiral ribbons intersecting said first spiral ribbons and providing spaces between adjacent ribbons.

41. A cover comprising: a sheet member having a surface and an outer peripheral edge, and protection pattern means anchored to the surface of the sheet member and extended over substantially the entire surface of said sheet member, said pattern means comprising a plurality of ribbons of phosphorescent material that emits light when subjected to light and subsequently located in a dark environment, said ribbons of phosphorescent material being spaced from each other and located over substantially the entire surface of the sheet member whereby when the sheet member is exposed to a lighted environment and subsequently to a dark environment the phosphorescent material emits light creating a lighted pattern of a graphic representation of a relatively wide and deep visual protective environment shield that mitigates a person's fears including nyctophobia, myxophobia, phasmophobia, teratophobia, and blennophobia, said ribbons of phosphorescent material include a plurality of first spiral ribbons having a generally longitudinal arrangement on the sheet member and a plurality of second spiral ribbons having a generally latitudinal arrangement on the sheet member, said second spiral ribbons intersecting said first spiral ribbons and providing spaces between adjacent ribbons, and means attached to the sheet member in the spaces between the adjacent ribbons operable to reflect visible light when subjected to light in the ultra violet wavelength range.

42. The cover of claim 41 including: magnet means associated with the ribbons for establishing magnetic forces which mitigate physiological and neurological conditions of the human body.

43. The cover of claim 42 wherein: the magnet means comprise permanent magnet means.

44. The cover of claim 41 wherein: alternate ribbons of the first and second spiral ribbons have different widths.

45. A cover comprising: a sheet member having a surface and an outer peripheral edge, and protection pattern means anchored to the surface of the sheet member and extended over substantially the entire surface of said sheet member, said pattern means comprising a plurality of ribbons of fluorescent material that reflects light when subjected to black light, said ribbons of fluorescent material being spaced from each other and located over substantially the entire surface of the sheet member whereby when the sheet member is exposed to black light fluorescent material reflects light creating a lighted pattern of a graphic representation of a relatively wide and deep visual shield like image, and phosphorescent material attached to the sheet member in the spaces between the ribbons, said fluorescent material reflecting visible light and said phosphorescent material emitting visible light when subjected to black light and said phosphorescent mateial emits light when subjected to light and subsequently located in a dark environment.

46. The cover of claim 45 wherein: the ribbons of fluorescent material include a plurality of first linear ribbons and a plurality of second linear ribbons positioned at an angle relative to the first linear ribbons.

47. The cover of claim 46 wherein: the first linear ribbons are laterally spaced from each other, and said second ribbons are laterally spaced from each other, said first and second ribbons intersecting each other and providing spaces between adjacent ribbons.

48. The cover of claim 47 wherein: alternate ribbons of said first and second ribbons have different widths.

49. The cover of claim 45 including: magnet means associated with the ribbons for establishing magnetic forces to mitigate physiological and neurological conditions of a human body.

50. A cover comprising: a member having a top surface, a plurality of intersecting ribbons of phosphorescent and fluorescent materials anchored to said surface, said ribbons being spaced from each other and extended over substantially the entire top surface of the member and forming a pattern thereon being a graphic representation of a shield whereby when the sheet member and ribbons are subjected to a lighted environment and subsequently to a darkened environment, the ribbons of phosphorescent materials emit light creating an imaginary protective environment and when the sheet member and ribbons are subjected to black light the ribbons of fluorescent materials reflect light and the ribbons of phosphorescent materials emit light.

51. The cover of claim 50 wherein: the ribbons include a plurality of first linear ribbons and a plurality of second linear ribbons positioned to an angle relative to the first linear ribbons and intersecting said first ribbons each of said first and second linear ribbons including at least one ribbon of phosphorescent material and at least one ribbon of fluorescent material.

52. The cover of claim 50 including: magnet means associated with the ribbons for establishing magnetic forces which mitigate physiological and neurological conditions of a human body.

53. A cover comprising: a member having a surface, first means of phosphorescent material anchored to said surface whereby when the member is subjected to a light environment and subsequently to a darkened environment the phosphorescent material emits light, and second means of fluorescent material spaced from the first means attached to said surface operable to reflect visible light when subjected to light in the ultra violet wavelength range.

54. The cover of claim 53 wherein: at least one of said first or second means comprise a plurality of ribbons anchored to said surface.

55. The cover of claim 54 wherein: the ribbons comprise intersecting linear ribbons.

56. The cover of claim 54 wherein the ribbons comprise spiral ribbons.

57. The cover of claim 54 including: magnet means secured to the member for establishing magnetic forces.

58. The cover of claim 57 wherein: the magnet means are permanent magnet means.

59. The cover of claim 53 wherein: at least one of said first or second means comprise a pattern of a graphic representation of a relatively wide and deep visual shield-like image.

* * * * *